United States Patent
Netto (10) Patent No.: US 9,164,802 B2
(45) Date of Patent: Oct. 20, 2015

(54) SYSTEM, METHOD AND PROGRAM PRODUCT FOR ALLOCATING RESOURCES AND SERVICES

(75) Inventor: Marco Aurelio Stelmar Netto, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 199 days.

(21) Appl. No.: 13/114,862

(22) Filed: May 24, 2011

(65) Prior Publication Data

US 2012/0303719 A1 Nov. 29, 2012

(51) Int. Cl.
*G06F 15/16* (2006.01)
*G06F 9/50* (2006.01)

(52) U.S. Cl.
CPC ........ *G06F 9/5011* (2013.01); *G06F 2209/503* (2013.01)

(58) Field of Classification Search
CPC  G06F 11/1471; G06F 11/1474; G06F 9/5072
USPC .......... 709/204, 206, 223–226, 219; 705/1, 5, 705/6, 8
See application file for complete search history.

(56) References Cited

U.S. PATENT DOCUMENTS

| | | | | |
|---|---|---|---|---|
| 5,493,692 | A * | 2/1996 | Theimer et al. | 455/26.1 |
| 5,721,943 | A * | 2/1998 | Johnson | 713/300 |
| 5,787,262 | A * | 7/1998 | Shakib et al. | 709/205 |
| 7,222,345 | B2 * | 5/2007 | Gray et al. | 718/104 |
| 7,506,090 | B2 * | 3/2009 | Rudnick et al. | 710/240 |
| 7,610,208 | B2 | 10/2009 | Salonen | |
| 7,702,802 | B2 * | 4/2010 | Stillion et al. | 709/229 |
| 8,082,226 | B2 * | 12/2011 | Ayotte et al. | 707/636 |
| 2002/0082856 | A1 * | 6/2002 | Gray et al. | 705/1 |
| 2003/0046393 | A1 * | 3/2003 | Mueller et al. | 709/225 |
| 2003/0140087 | A1 * | 7/2003 | Lincoln et al. | 709/201 |
| 2005/0021876 | A1 * | 1/2005 | Asai et al. | 710/1 |
| 2005/0060409 | A1 * | 3/2005 | Dube et al. | 709/226 |
| 2005/0165921 | A1 * | 7/2005 | Abadir et al. | 709/223 |
| 2005/0246707 | A1 * | 11/2005 | Ismail et al. | 718/100 |
| 2005/0259683 | A1 * | 11/2005 | Bishop et al. | 370/468 |
| 2006/0238797 | A1 * | 10/2006 | Berglin | 358/1.15 |
| 2006/0294044 | A1 * | 12/2006 | Karlsson et al. | 707/1 |
| 2007/0173965 | A1 * | 7/2007 | Eller et al. | 700/100 |

(Continued)

OTHER PUBLICATIONS

Netto, M. A. S. (2009). Adaptive Co-Allocation of Distributed Resources for Parallel Applications (Doctoral dissertation, University of Melbourne, Department of Computer Science and Software Engineering), hereafter "Netto".*

(Continued)

*Primary Examiner* — Asad Nawaz
*Assistant Examiner* — Berhanu Belete
(74) *Attorney, Agent, or Firm* — Law Office of Charles W. Peterson, Jr.; Louis J. Percello, Esq.

(57) ABSTRACT

A shared resource system, method of sharing resources and services and a computer program product therefor. Client computers communicate with at least one provider computer that selectively makes resource capacity available to the client computers. The client computers and provider computer pass messages to each other negotiating access to provider resources and services. The provider computer(s) notifies each requesting client computer of any potential conflicts with any portion of the requested capacity in confirmation qualification messages.

24 Claims, 6 Drawing Sheets

(56) References Cited

U.S. PATENT DOCUMENTS

| | | | |
|---|---|---|---|
| 2007/0208604 A1* | 9/2007 | Purohit et al. | 705/9 |
| 2007/0282654 A1* | 12/2007 | Sarkar | 705/8 |
| 2008/0126547 A1* | 5/2008 | Waldspurger | 709/226 |
| 2008/0172673 A1* | 7/2008 | Naik | 718/104 |
| 2009/0144756 A1* | 6/2009 | Inami | 719/318 |
| 2009/0170472 A1* | 7/2009 | Chapin et al. | 455/410 |
| 2010/0257143 A1* | 10/2010 | Sosnosky et al. | 707/682 |
| 2011/0022438 A1* | 1/2011 | Lian | 705/8 |
| 2011/0208606 A1* | 8/2011 | Hadar et al. | 705/26.2 |
| 2011/0225142 A1* | 9/2011 | McDonald | 707/710 |
| 2012/0084183 A1* | 4/2012 | Shanker et al. | 705/30 |
| 2012/0102498 A1* | 4/2012 | Subramanya et al. | 718/104 |

OTHER PUBLICATIONS

Jardine et al., "Livelock avoidance for meta-schedulers", "Proceedings of International Symposium on High performance Distributed Computing", Aug. 2001.

Hah et al., "A SNAP-based community resource broker using a three-phase commit protocol: a performance study", "The Computer Journal", Oct. 5, 2004, pp. 333-346, vol. 48, No. 3.

* cited by examiner

SYSTEM, METHOD AND PROGRAM PRODUCT FOR ALLOCATING RESOURCES AND SERVICES

BACKGROUND OF THE INVENTION

1. Field of the Invention

The present invention is related to allocating resources amongst multiple computers and more particularly to managing and allocating resources for cloud computing.

2. Background Description

Recently, cloud computing has offered great opportunities for a broad range of applications. Cloud service providers (e.g., with mainframe computers), users/clients connected together over networks constitute a client-cloud system wherein the cloud computers provide services and resources and handle data-intensive computing tasks for the clients. This has allowed user clients to become much more lightweight and mobile, while still to having require access to resources managed by the resource providers.

Typically, users may request allocation of available resource capacity from one or more providers simultaneously or essentially simultaneously, i.e. within a given time interval. A typical state of the art resource protocol for allocating resources has two phases: the selection phase where the user selects available resources; and, the confirmation or commit phase, the user confirms the resource allocation. The selection phase is first come, first served. So, when multiple users select (request) the same resource(s), the first user who commits the selection receives the resource i.e., confirms. Frequently, however, there is a delay between selecting/requesting a resource or resources and confirmation/commit that causes a conflict. Conflicts arise because during that delay resource availability information may become stale. This can result in what is known as deadlock and/or livelock.

Deadlock occurs when a user with a committed resource (locked) is waiting for another requested resource, e.g., where the other resource is committed to another user and the first user is waiting for that committed resource to become available. Deadlocks can be avoided by refusing to allocate less than all of the requested resources or services, i.e., all or nothing.

Livelock occurs when multiple users requesting multiple resources are each granted access to some, but not all of the requested resources. In a sort of round robin game of resource tag, while one user is deciding to commit desired capacity, some or all of that desired capacity can be allocated elsewhere. So, to avoid having capacity allocated elsewhere, the user may have to hurry decisions after selecting resources. Otherwise, with the requested capacity allocated elsewhere, the user may take several iterations (messages with the providers) negotiating to recover from stale information. Consequently, the negotiation messages can waste valuable computing time and resources, and therefore, may be expensive.

State of the art approaches for reducing the number of messages required by negotiations include Order-based Deadlock Prevention Protocols (ODP2) and back-off mechanisms. Examples of these approaches are described by Jardine et al. "Livelock avoidance for meta-schedulers," *Proceedings of International Symposium on High performance Distributed Computing.* (2001); and by Hah et al., "A SNAP-based community resource broker using a three-phase commit protocol: a performance study," *The Computer Journal* (2005). These state of the art approaches do not make users aware of any other users that may be concurrently negotiating for the same resources. Instead, only when allocation fails do users receive messages that indicate committing the request failed. Consequently, these state of the art negotiations require several messages and allow users too little time to make allocation decisions.

Thus, there is a need for a reducing negotiations required in allocating resources to users and more particularly in facilitating resource allocation with minimal conflicts, without rushing user decisions.

SUMMARY OF THE INVENTION

A feature of the invention is reduced effort in sharing resources and services;

Another feature of the invention is that during negotiation for shared resources and services, requesting users/clients are informed of potential conflicts in real time;

Yet another feature of the invention is that during negotiation for shared resources and services, users/clients requesting resources and services with potential conflicts to other users/clients are given an opportunity in real time to adjust resource selection to avoid failing requests.

The present invention relates to a shared resource system, method of sharing resources and services and computer program product therefor. Client computers communicate with at least one provider computer that selectively makes resource capacity available to the client computers. The client computers and provider computer pass messages to each other negotiating access to provider resources and services. The provider computer(s) notifies each requesting client computer of any potential conflicts with the requested capacity in confirmation qualification messages.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
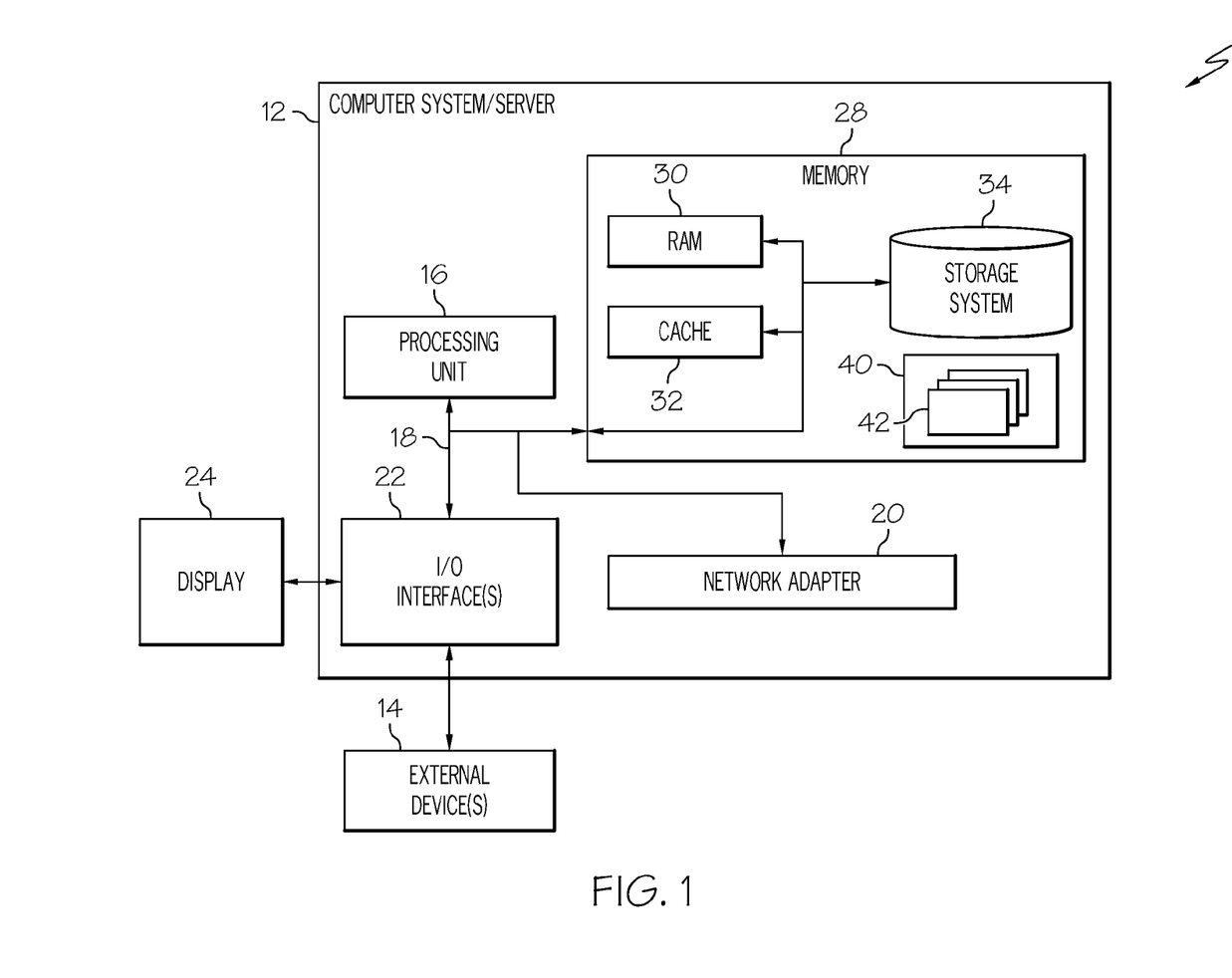
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
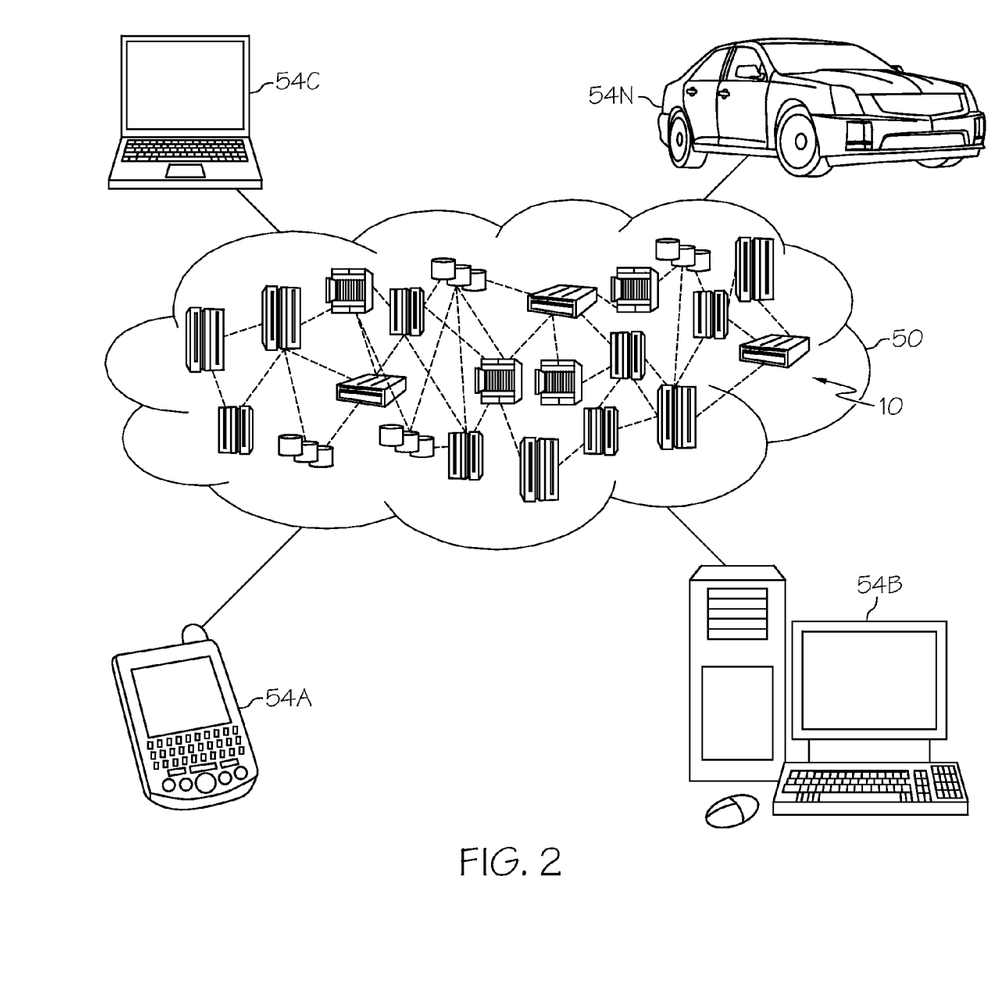
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
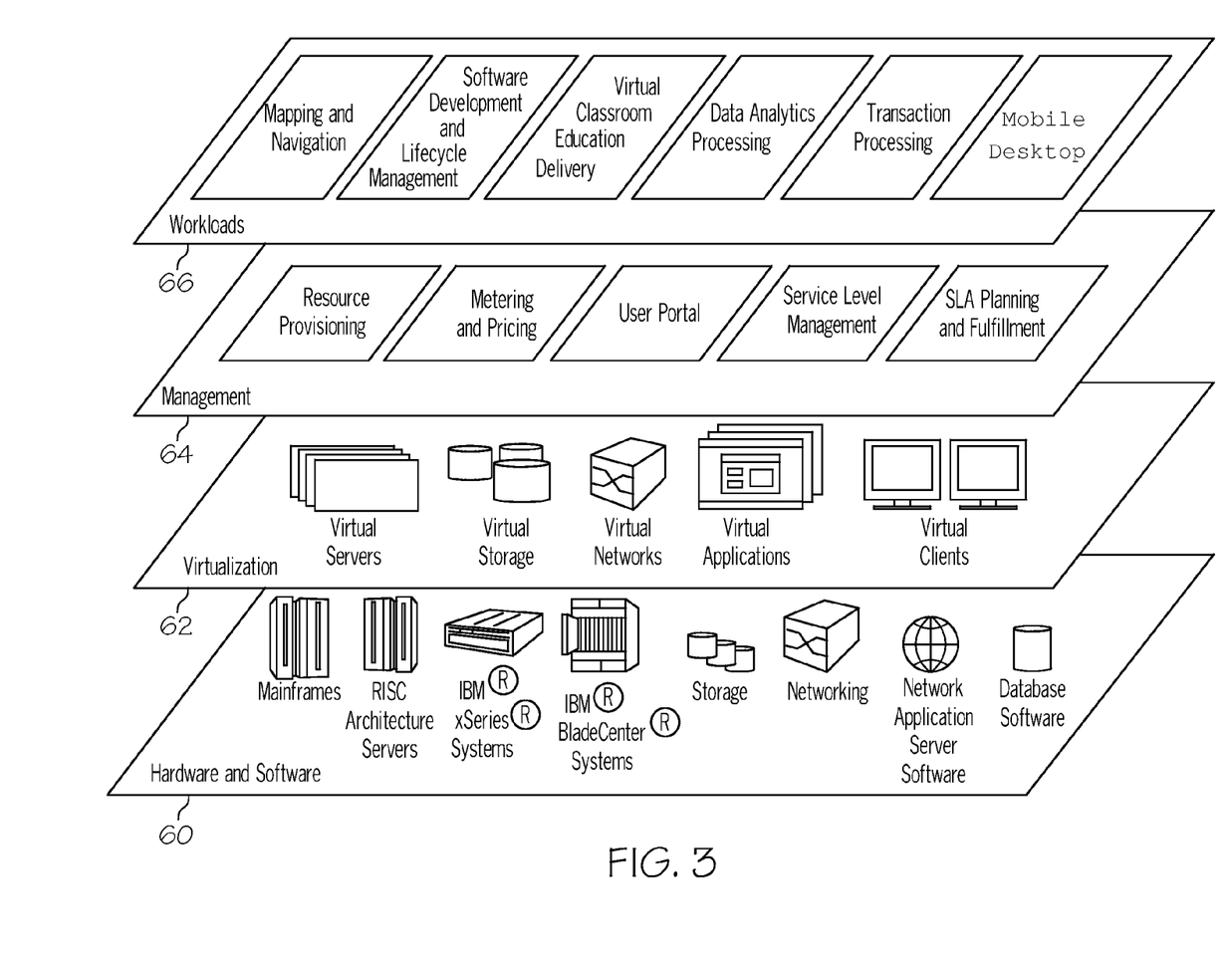
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktop.

Figure 4:
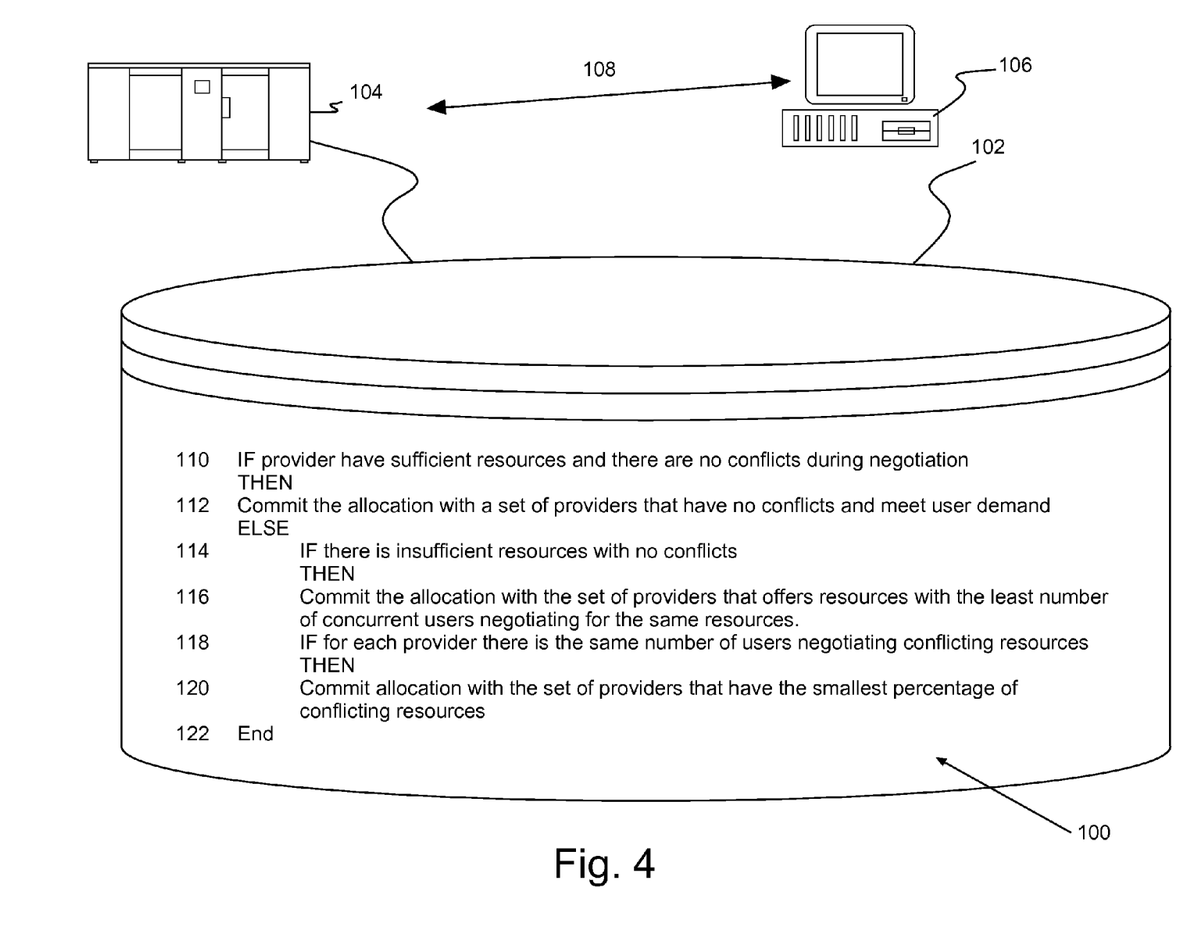
FIG. 4 shows an example of resource allocation pseudo code stored in a computer readable medium for committing resource allocation(s) once a user receives information about resource availability (and resource conflicts) from providers according to a preferred embodiment of the present invention.

FIG. 4 shows a pseudo code example of resource allocation 100 stored in a medium 102 readable by computer 104 for committing resource allocation(s) once a user 106 receives information about resource availability (and resource conflicts) from providers according to a preferred embodiment of the present invention. The computer 104 and client computer(s) 106 communicate using messages 108.

Again, as noted hereinabove, although described with reference to cloud computing, the present invention has application beyond cloud computing. For example, the present invention may be applied to state of the art resource scheduling systems such as booking systems for health services, appointments, rental cars and tickets for venues; and further, to activity and appointment scheduling systems.

An example of such a state of the art resource scheduling system is provided by Salonen, U.S. Pat. No. 7,610,208, "Booking Method And System." An appointment scheduling systems is proposed by Sarkar, published U.S. Patent Application No. 2007/0282654, "Appointment scheduling system," which describes alerting users of appointment changes in schedules. For an example of a scheduling system where users may not be aware of other users' intentions, see Purohit et al., published U.S. Patent Application No. 2007/0208604, "Method and system for scheduling activities." In the Purohit et al. example users use several iterations to schedule activities, but where users may be unaware about conflicting allocation decisions. Application of the present invention to Purohit et al., for example, can reduce the number of iterations users require making schedule adjustments (e.g., scheduling meetings) that require negotiating with a number of users, constrained by user schedule constraints.

Preferably, the code 100 and/or copies of the code 100 is (are) distributed and stored in storage 102 in multiple computers 104, 106 at diverse locations and executed at those or different locations. It should be noted that, although shown here as a mainframe computer or server 104 and desktop computer 106, this is for example only. Computer 104 and client computers 106 may be any computer with installed code and/or that has sufficient capability to provide resource allocation, e.g., a mid-sized computer, a personal computer (PC), a netbook, a tablet computer, or a smart phone such as a Windows®, an iOS™ or an Android™ based phone or any other device described hereinabove. Also, the client computers 106 may also be acting interchangeably with the servers 104, i.e., under some circumstances a client computer 106 may be acting as a server for the server 104 acting as a client.

So, according to a preferred embodiment of the present invention, providers let users know in real time about any conflict that arise during negotiation for resources. While negotiating for resources requesting users receive conflict information from, and interact only with, the resource providers, not with one another. This minimizes conflicts and maintains user privacy during negotiations. Further, users address problems with resource allocation through request modification between selection and request confirmation. So, rather than making adjustments post confirmation, the present invention minimizes post negotiation adjustment. This reduces user costs, e.g., with regard to contracts with excess message penalties.

In a request a user may just select resources without selecting the provider or, select one provider or a group (set) of providers, whatever meets his/her computing demands or needs. Allocation begins with satisfying simple requests, i.e., requests that will not incur a conflict. So, in 110, if for any request all of the requested providers have sufficient resources to satisfy the request without conflicts; then, in 112 resources are allocated for that request and, if requested, for the requested set of resource providers. These users' demand has been met.

Otherwise, if a request cannot be satisfied without a potential conflict, in 114 there are insufficient resources with no conflicts; and, resources are allocated in 116 from a subset(s) of providers. The first selected subset are the resource providers with the minimum concurrent users negotiating for the same resources. If in 118, however, every provider has the same number of users negotiating for conflicting resources; then, turning to a second subset in 120, resources are allocated from the sub-set of providers that have the smallest percentage of conflicting resources; and allocation/commit is complete 122 where a conflict can be avoided.

Figure 5:
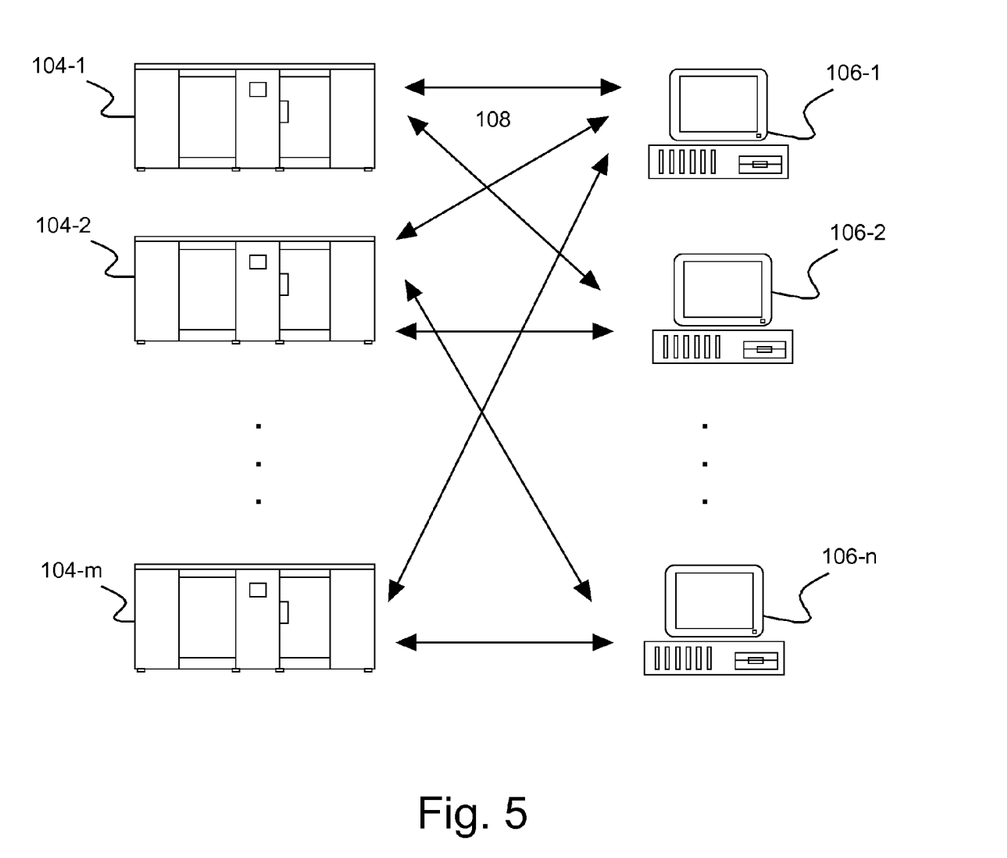
FIG. 5 shows a computing environment example including users, resource providers managing computing capacity, and negotiation messages passing between user client devices and provider computers.

FIG. 5 shows a simplified computing environment example, which includes user/client devices 106-1-106-*n* (where n is a positive integer), resource providers 104-1-104-*m* (where m is a positive integer, typically much smaller than n) managing computing capacity, e.g., the computers 104-1-104-*m*, network bandwidth, and/or services. Providers 104-1-104-*m* and user client devices 106-1-106-*n* pass messages 108 with information for negotiating and determining what resources are available for each user.

As noted hereinabove, resource providers previously did not disclose information about competing requests for resources. Therefore, negotiation between prior system users and providers required a number of messages (that consumed expensive system resources) to reach agreement. Consequently, prior system users had less time to make resource allocation decisions.

In contrast, according to a preferred embodiment of the present invention, resource providers provide users with information 108 on the level of concurrent interest for requested resources, e.g., the number of other users at client devices 106-2-106-*n* negotiating for the same resources. So, all users (or entities operating on their behalf, e.g., client device 106-1) are aware in real time of conflicting interests, i.e., the extent and intentions of other users concurrently negotiating for conflicting resources. Thus, users are warned when a potential for conflict arises or exists.

Users can avoid wasting time on unavailable or soon to be unavailable resources, which reduces the number of negotiation messages 108. So, each user can decide unrushed, at least until a potential conflict arises. Further, because users requesting resources that are already requested by another user receive a response to that effect, the response makes those users immediately aware that the requests are/may be futile. Thus, each user has the maximum available time for deciding which (combination of) resources to commit, and to adjust requests, if necessary. Because users can revise requests in real time, each user can avoid collisions/conflicts, and thus each user is much more likely to confirm allocation requests.

Figure 6A:
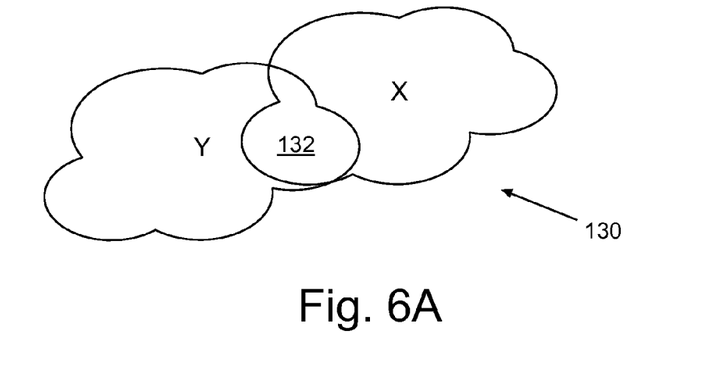
FIGS. 6A-B show an example of two users negotiating resources with a resource provider.
Figure 6B:
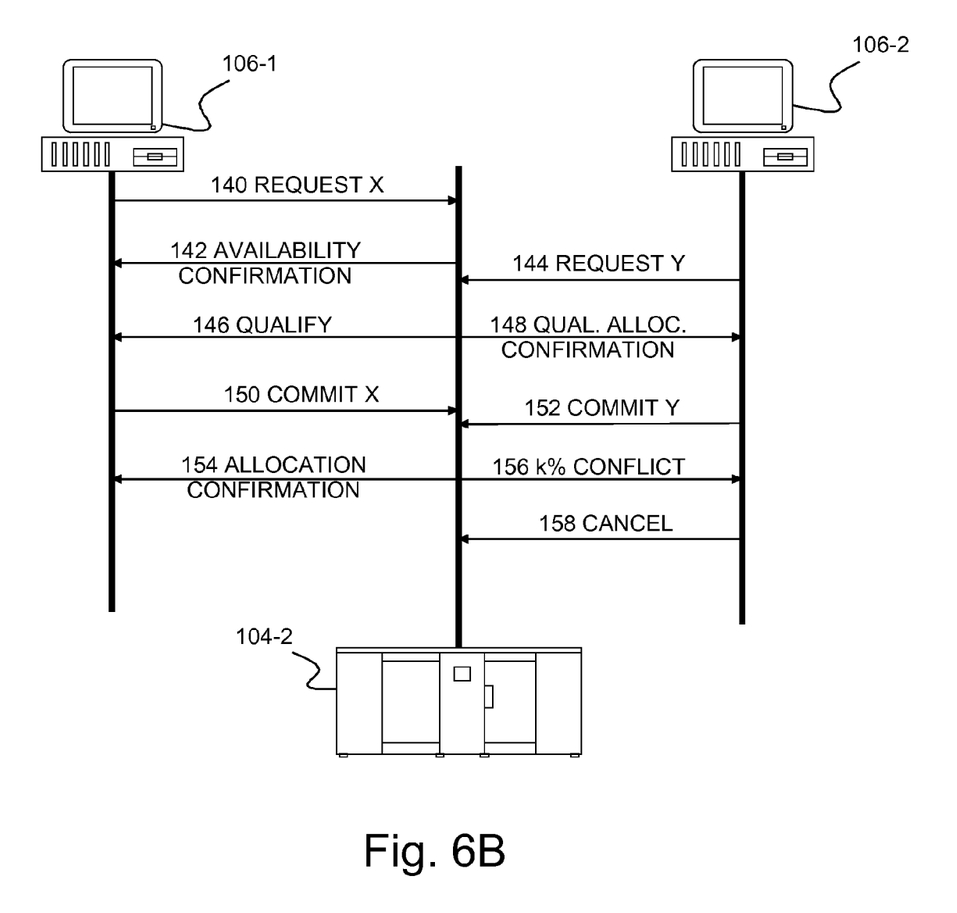

FIGS. 6A-B show an example of two users 106-1, 106-2 concurrently negotiating resources 130 with a provider 104-2, wherein the available resources fall short 132, which results in a conflict for that portion. During the negotiation, the users 106-1, 106-2 receive information on what percentage of total required capacity is being concurrently negotiated by other users 106-2, 106-1, and the number of those users.

Negotiation begins when one user 106-1 requests 140 resource capacity X from resource provider 104-2. The resource provider 104-2 responds 142 indicating/confirming the availability of capacity X with an availability confirmation message. At the same time or shortly thereafter, the other user 106-2 requests 144 resource capacity Y, where the available capacity is less than X+Y, i.e., capacity for one user, 106-1 or 106-2, falls short by 132. Upon receiving the request, the resource provider 104-2 responds 146, 148 to both users 106-1, 106-2. In contrast to prior approaches, whenever a preferred service provider 104-2 receives a subsequent request message 144 from a user 106-1, 106-2 requesting overlapping resources, the service provider 104-2 responds with a qualified message 146, 148 describing: whether the requested capacity is available; with a qualification that indicates what portion, if any, conflicts with capacity concurrently being negotiated by other users; and the number users negotiating for conflicting capacity.

So, the resource provider 104-2 responds with a qualification message 146 to the first user 106-1, that indicates that the requested capacity X is still available, but with the qualification that j % (where portion 132 is j % of X) has also been requested by (an)other users. At the same time, the resource provider 104-2 responds 148 to the other user 106-2 with a qualified confirmation message, indicating/confirming the availability of capacity Y, but also with a qualification indicating that portion k % (where portion 132 is k % of Y) has also been requested by other users. So, the qualification places each user 106-1, 106-2 on notice that the resource provider(s) 104-2 may not be able to allocate all of his/her requested resources X and/or Y, respectively. At this point one user could select (not shown) either other resources or providers for the respective request.

Instead, in this example, the first user 106-1 responds before the other with a commit message 150 committing allocation of requested resource capacity X. Again at the same time or shortly thereafter, the other user 106-2 responds with a commit message 152 committing allocation of requested resource capacity Y. The resource provider 104-2 again responds 154,156 to both users 106-1, 106-2. The resource provider 104-2 confirms 154 allocation of capacity X to the first user 106-1 with an allocation confirmation message. The resource provider 104-2 responds 156 to the other user 106-2 with a message that indicates that the available capacity falls short, i.e., Y falls short by portion 132. As the available resources are insufficient, user 106-2 cancels 158 the request with a cancellation message and this negotiation ends and the user 106-2 can request different services/resources.

Thus advantageously, providers keep all users aware in real time about any potential conflicts and the level of potential conflicts that arise during negotiation, i.e., resources being concurrently negotiated by other users, as well as the number of other users with concurrent interest. This allows real time modification of active requests. Rather than failing negotiation and making adjustments post confirmation, users are much more likely to confirm allocation requests without collisions/conflicts with other users. Thus, the present invention minimizes post negotiation adjustment messages, because problems with resource allocation are addressed in real time between selection and request confirmation. Because negotiation messages are minimized, user costs may be reduced, for example, where service contracts include excess message penalties.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
    a plurality of client computers;
    a plurality of provider computers selectively making resource capacity available to said plurality of client computers;
    a network connecting said plurality of client computers to said at least one provider computer, said plurality of client computers and said plurality of provider computers passing messages to each other over said network, wherein said messages include request messages from requesting client computers requesting resource capacity from said plurality of client computers and confirmation messages confirming resource availability and/or allocation; and
    two or more of said plurality of client computers requesting resource capacity from said plurality of provider computers, said plurality of provider computers further sending confirmation qualification messages notifying in real time each of said two or more of any potential conflicts with any portion of the requested capacity as each conflict arises, the qualification messages indicating the size of the portion of requested resources in conflict, such that each notified requesting client computer can modify respective resource requests responsive to said qualification messages to eliminate resource conflicts prior to returning a commit message to said plurality of provider computers, wherein said messages further include commit messages from requesting client computers, each requesting client computer sending a commit message responsive to unqualified confirmation messages, and selectively sending a modified request message or cancellation message responsive to qualification messages, modified request messages comprising requesting other resources from a selected provider, and selecting another provider to provide requested capacity.

2. A shared resource system as in claim 1 wherein said plurality of provider computers are cloud computers in a cloud environment and one or more said messages includes a selection of providers providing requested capacity.

3. A shared resource system as in claim 2 wherein said messages from cloud resource provisioning includes conflict messages indicating that a conflict has prevented allocating a portion of requested resources and said messages from said client devices include cancellation messages to said cloud resource provisioning cancelling requests.

4. A shared resource system as in claim 2 wherein cloud resource provisioning selectively confirms allocation of potentially conflicted portions of resources, and gives priority to requests for resources from providers with the least number of requests for the same resources, followed by requests for resources from providers having the smallest conflicting portion.

5. A shared resource system as in claim 1 wherein said confirmation qualification messages notify each respective client computer in real time of the number of the client computers requesting each said portion.

6. A method of managing allocation of resource capacity, said method comprising:
    receiving a plurality of requests for resource capacity from provider computers;
    determining whether said provider computers have available resource capacity sufficient to satisfy all requests;
    identifying potentially conflicting requests;
    providing availability confirmations for available resources to requesters, qualified availability confirmations being provided for said identified availability confirmations having a potential conflict, said qualified availability confirmations notifying requesters of a potential conflict in real time, said qualified availability confirmations and the conflict notifications notify each requester in real time of the size of the portion of requested resources in conflict;

receiving a commit for confirmed resources from said requesters;

providing a resource allocation confirmation to one or more of said notified requesters;

providing a conflict indication to at least one other of said requesters that less than the respective requested resource capacity is available; and receiving a commit, a modified request or a cancellation from said at least one other responsive to said qualified availability confirmations and the conflict notifications, said modified request either requesting other resources from the selected provider, or selecting another provider to provide requested capacity.

7. A method of managing allocation of resource capacity as in claim 6, wherein one or more said requests select providers for providing requested capacity.

8. A method of managing allocation of resource capacity as in claim 7, wherein said qualified availability confirmations further notify requesters of the number of the requesters interested in each said portion, said method further comprising receiving either a cancellation or said modified request from said at least one other notified requester.

9. A method of managing allocation of resource capacity as in claim 6, wherein whenever for at least one requester it is determined that no said resource allocation conflict exists for requested resources, said method comprises providing an unqualified confirmation to each respective at least one requester.

10. A method of managing allocation of resource capacity as in claim 9, wherein whenever a request for confirmed resources is received before said confirmed resources are committed, said method comprises providing a qualification to the respective at least one requester.

11. A method of managing allocation of resource capacity as in claim 6, wherein when fewer requests for resource capacity are received for one or more providers than remaining said providers, said method comprises providing said allocation confirmations of said one or more providers' resources prior to providing conflict indications.

12. A method of managing allocation of resource capacity as in claim 6, wherein when the same number of requests for resources are received for each provider, said method comprises confirming allocation of resources for requests having the fewest conflicts prior to providing conflict indications.

13. A computer program product for managing allocation of resource capacity, said computer program product comprising a non-transitory computer usable medium having computer readable program code stored thereon, said computer readable program code causing one or more computers executing said code to:

receive requests for resource capacity from provider computers, said requests selectively identifying providers for providing requested capacity;

determine whether said provider computers have available resource capacity sufficient to satisfy all requests;

identify requests potentially conflicting with requested resource portions being requested by other requests;

provide an availability confirmation to each of said requests, a qualified availability confirmation being provided for identified potentially conflicting requests, each said qualified availability confirmation notifying a respective requester of a potential for a resource allocation conflict in real time, wherein qualified confirmations and conflict indications notify each requester in real time of the size of the portion of requested resources in conflict;

receive a commit for confirmed resources from requesters;

confirm resource allocation to committed requesters identified with unqualified availability confirmations;

provide a conflict indication to at least one other committed requester that less than the respective requested resource capacity is available; and receive a commit, modified requests or a cancellation from said at least one other committed requester responsive to said qualified availability confirmations and the conflict notifications, said modified requests either requesting other resources from the identified provider, or identifying another provider to provide requested capacity.

14. A computer program product for managing allocation of resource capacity as in claim 13, wherein said provider computers are providing requested capacity in a cloud environment, and qualified confirmations and conflict indications notify each requester in real time of the number of the requesters interested in each said portion in conflict.

15. A computer program product for managing allocation of resource capacity as in claim 13, wherein whenever said one or more computers determine that no said resource allocation conflict exists for any portion of resources requested for at least one request, said one or more computers provide an unqualified confirmation to each respective at least one requester prior to providing conflict indications.

16. A computer program product for managing allocation of resource capacity as in claim 15, wherein whenever said one or more computers receive a request for confirmed available resources before said confirmed available resources are committed, said one or more computers provide a qualification to said respective at least one requester.

17. A computer program product for managing allocation of resource capacity as in claim 13, wherein whenever said one or more computers receive fewer requests for resources from one or more providers than for resources from remaining said providers, said one or more computers confirm allocation of said resources from said one or more providers prior to providing conflict indications.

18. A computer program product for managing allocation of resource capacity as in claim 13, wherein whenever said one or more computers receive the same number of requests for each resource provider's resources, said one or more computers confirm allocation of resources with fewest conflicts prior to providing conflict indications.

19. A computer program product for managing allocation of resource capacity as in claim 13, wherein said conflict indication indicates that the requested resource capacity requested by said at least one other notified requester conflicts with at least a portion of resource capacity requested by a confirming requester, said one or more computers further receiving a cancellation from one or more conflicted requester.

20. A computer program product for managing allocation of resource capacity, said computer program product comprising a non-transitory computer usable medium having computer readable program code stored thereon, said computer readable program code comprising:

computer readable program code for causing one or more computers to receive requests for a portion of available resource capacity, said requests selectively identifying providers for providing requested capacity;

computer readable program code for causing said one or more computers to determine whether said available resource capacity is sufficient to satisfy all requests and to identify any requests with potential resource allocation conflicts;

computer readable program code for causing said one or more computers to provide resource availability confirmations for requests identified with no conflicts;

computer readable program code for causing said one or more computers to qualify availability confirmations, the qualification providing notification of an identified potential resource allocation conflict and the size of the portion of requested resources in conflict, a qualified availability confirmation being provided prior to receiving a commit, qualifying said availability confirmations providing a qualification in real time whenever a newly received request causes any conflict in confirmed available resources;

computer readable program code for causing said one or more computers to receive commits for confirmed and qualified confirmed available resources;

computer readable program code for causing said one or more computers to confirm resource allocation where such resource allocation satisfies a respective request;

computer readable program code for causing said one or more computers to selectively provide conflict notifications that less than all requested resource capacity is available, whereby notified requesters can modify resource requests to eliminate resource conflicts and submit new requests;

computer readable program code for causing said one or more computers to receive first type modified requests requesting other resources from the identified provider: and computer readable program code for causing said one or more computers to receive second type modified requests identifying another provider to provide requested capacity.

21. A computer program product for managing allocation of resource capacity as in claim 20, wherein said notification notifies each conflicting requester in real time of the number of the requesters interested in each said portion, and wherein receiving requests includes receiving resource provider selection and confirming resource allocations selectively confirms resource allocations of said qualified confirmed available resources.

22. A computer program product for managing allocation of resource capacity as in claim 21, wherein confirming resource allocations first confirms resource allocation of resources from providers with fewer requests than from remaining said providers.

23. A computer program product for managing allocation of resource capacity as in claim 22, wherein confirming resource allocations first confirms resource allocation of resources with fewest conflicts.

24. A computer program product for managing allocation of resource capacity in a cloud environment as in claim 20, said computer program product further comprising:

computer readable program code for causing said one or more computers to receive a cancellation of an unfilled request.

* * * * *